June 8, 1926. 1,588,251
A. McNAB
SHAFT MOUNTING
Filed Dec. 8, 1925 2 Sheets-Sheet 1
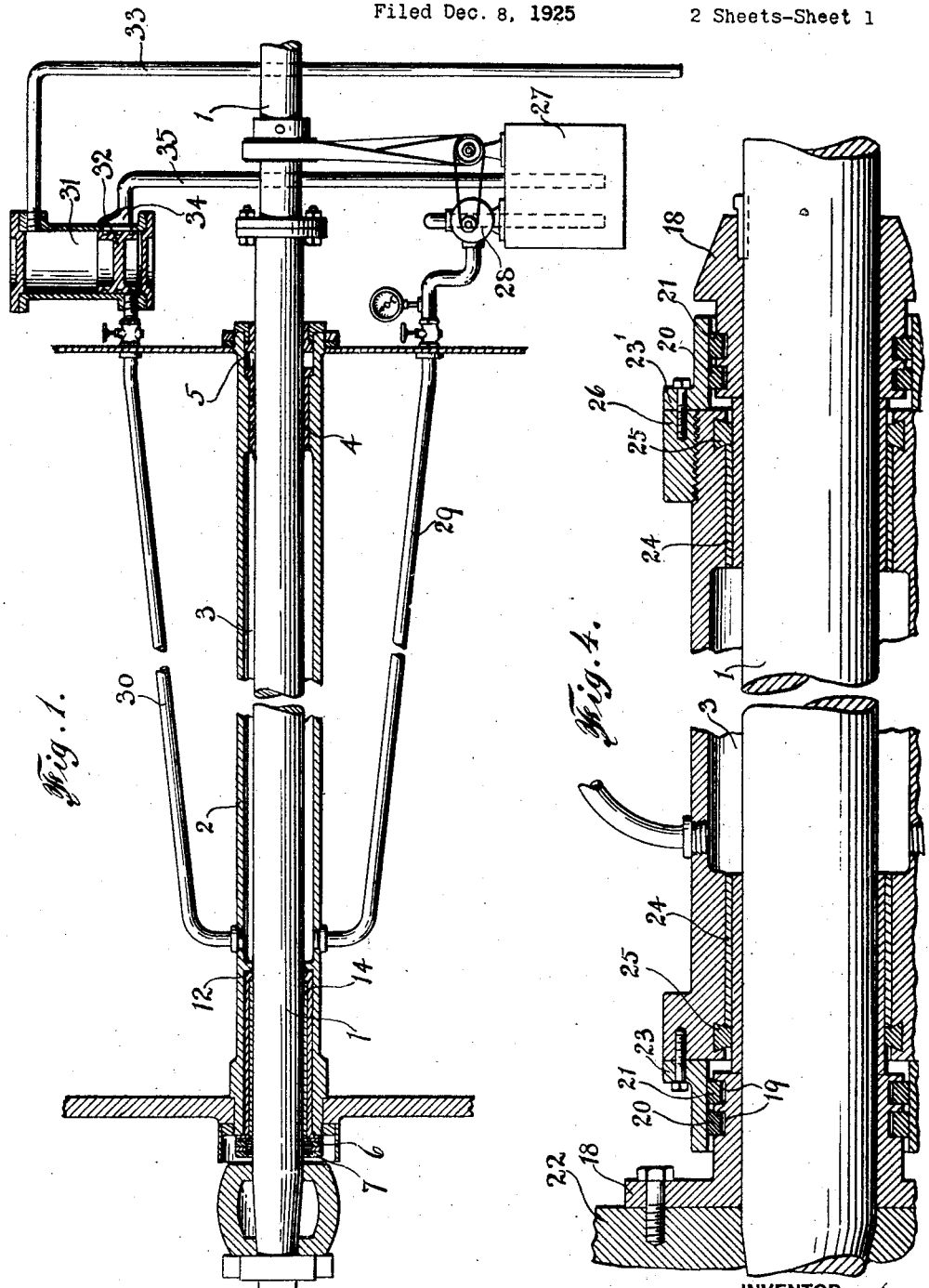
INVENTOR
Alexander McNab
BY
Marks & Clerk
ATTORNEY June 8, 1926.

A. McNAB 1,588,251

SHAFT MOUNTING

Filed Dec. 8, 1925    2 Sheets-Sheet 2

INVENTOR
Alexander McNab
BY
Marks & Clerk
ATTORNEY

Patented June 8, 1926.

1,588,251

UNITED STATES PATENT OFFICE.

ALEXANDER McNAB, OF BRIDGEPORT, CONNECTICUT.

SHAFT MOUNTING.

Application filed December 8, 1925. Serial No. 74,073.

This invention relates to shaft mountings such as the tail shaft mountings of power driven vessels and is particularly intended to provide an improved form of the construction of the device described in my U. S. Patent No. 1,315,677.

The device described in that patent relates to a system of pressure lubrication for a tail shaft, the mounting being designed to prevent the entry of salt water or deleterious material into any part of said mounting.

The damage caused by the entry of salt water carrying sand or grit into the tail shaft mounting needs no emphasizing, but it may not be generally understood that the water in some localities is corrosive owing to the decomposition of vegetable or other organic matter.

Briefly described, the tail shaft mounting described in my patent referred to and utilized in carrying out the present invention is so constructed that the space between the usual stern tube and the tail shaft mounted therein, is being supplied with a lubricating medium, and suitable glands are arranged at the inboard and outboard ends of the tube designed to prevent the egress of lubricating fluid. It has been found in practice, however, that owing to the rapid fluctuations of the pressure effective on the outboard end of the stern tube, due to the pitching of the vessel, that it is practically impossible to prevent loss of oil through the outboard end of the mounting, since a pressure sufficient to keep out water when the stern tube and tail shaft are submerged at a maximum depth below the water line, is so high that the lubricant is liable to be forced through the after gland when the effective pressure is materially reduced or entirely removed, due to the pitching of the vessel, when of course the propeller may be lifted clear of the water. It has further been found by experience that although the rear gland may form a satisfactory closure against the entry of water under normal conditions, yet under extreme conditions of rapid fluctuations of pressure, a certain amount of water will enter despite the rings or other packing devices employed. The entry of water, frequently carrying abrasive material such as sand, of course to a certain extent nullifies the advantages otherwise gained by the provision of an oil lubrication system, since labor is involved in dismounting the packing rings at the tail end of the shaft in order to draw the shaft for renewal of liners or bushings and the removal of pitting, score marks, or grooves worn by such abrasive material, while the water itself may cause serious corrosion.

The object of the invention is to provide an oil lubrication system for a tail shaft mounting in which the pressure of the oil supplied to the mounting shall be automatically varied to equalize fluctuations of pressure at the outboard end of the tail shaft, thus preventing loss of lubricant and entry of water and deleterious material.

A further object of the invention is to provide an oil lubrication system for a tail shaft mounting in which the pressure of the oil supplied to the mounting is automatically controlled by the pressure exerted by the water on the outboard end of the mounting at whatever depth below the water line the outboard end of the propeller may happen to be.

A still further object of the invention is to provide an oil lubrication system for a tail shaft mounting in which the pressure of the oil supplied to the mounting is automatically varied, according to the pressure of the water effective on the outboard end of the tail shaft, by a mechanism of maximum simplicity and of a minimum number of working parts.

In the accompanying drawings a preferred form of the invention is illustrated by way of example but it will be realized that various constructional modifications of the apparatus shown may be readily effected by those conversant with the art and is not desired, therefore, to limit the scope of the invention in any way to the embodiments illustrated and described but only as defined by the appended claims.

Figure 1 is a side elevation partly in section of a tail shaft mounting fitted with the device of my invention.

Fig. 4 is an enlarged view partly in section of a shaft mounting in which an alternative form of packing is utilized.

Figure 3:
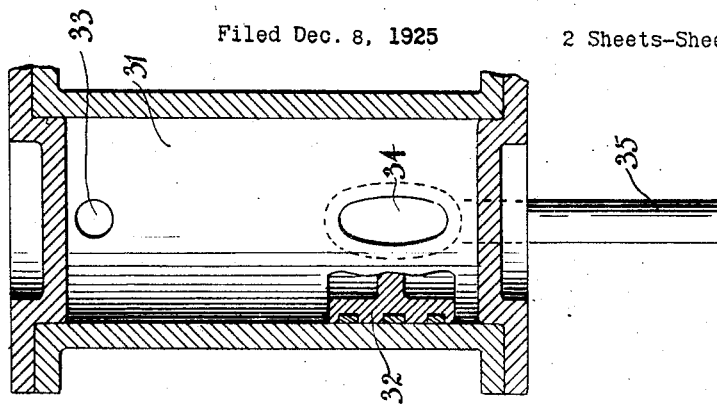
Figure 3 is an enlarged view in cross section on the line 3—3 of Fig. 1 of the control cylinder.

In the drawings 1 denotes the tail shaft and 2 the stern tube. A recess 3 adapted to contain lubricant between the surface of the tail shaft and the stern tube, is provided by the normal clearance provided for the insertion of liners between the shaft and tube or by the clearance between the inner surface of the tail tube and shaft as provided in standard practice. A bushing 4 is placed between the recess 3 and the inboard packing gland 5 while a liner 14 is carried in a bushing 12 at the outboard side of said recess. Bushings 4 and 12 are held against longitudinal movement in any suitable manner, in the construction illustrated, bushing 4 being held against a shoulder on the stern tube by the packing of inboard gland 5 while the outboard bushing is held in place by the abutment of a flange thereon against the end of the stern tube.

Figure 2:
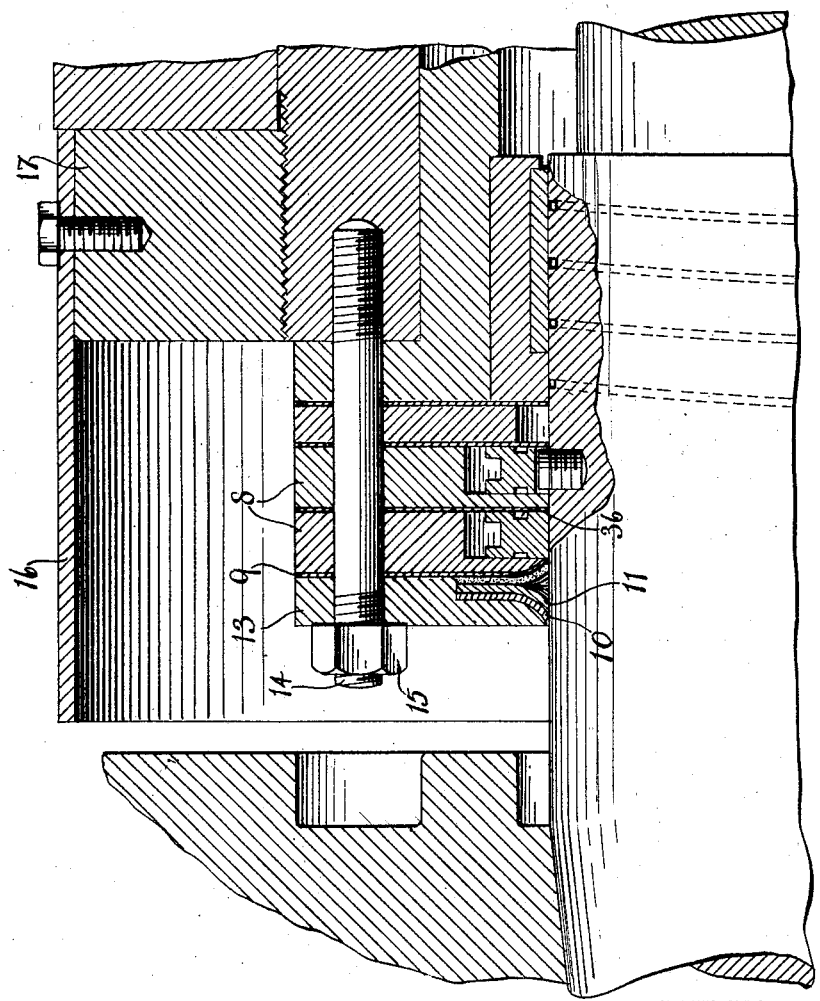
Figure 2 is a perspective view in section on the line 2—2 of Fig. 1 of the oil retaining packing.

To prevent loss of oil under normal circumstances from the outboard end of the tail shaft bearing, the oil retaining construction of the general type described in my prior patent 1,315,677 is utilized. This construction (Fig. 2), comprises an oil retaining ring or rings 6 together with flexible rings 7 clamped to the end of the stern tube and bearing against the surface of the tail shaft. In the construction illustrated in Fig. 1 a plurality of rings 6 is provided and is mounted on the tail shaft so as to rotate therewith either by being a driven fit thereon or by being keyed thereto, which latter method is preferable since it provides positively that the rings will rotate with the tail shaft. The rings, which may be of any suitable form used for pressure retaining purposes, are shown of U-shape in cross section, this form having proved very satisfactory in actual use. The rings engage in grooves formed in collars $8^1$, a separate collar preferably being provided to co-operate with each ring, and for ease of assembly being formed in two parts $8^1$, $8^2$. A water tight joint to prevent entry of water radially through the rings is provided for by arrangement of washers 9 of fiber, rubber, oil impregnated paper, or other suitable material, between the rings. The entry of water along the shaft between the rings and the surface of the shaft is prevented by flexible washers 10, two such washers are shown in Fig. 2, the inner washer 11 being of felt while the outer washer 10 may be of rubber impregnated material or other suitable composition, these washers 10, 11 may be held in place by an end ring 13. All of the rings and washers are conveniently mounted upon the end of the stern tube by means of bolts 14 threaded into the end of the stern tube and having their outer ends tapped to take nuts 15 which may be screwed up against the end ring and thus clamp the whole assembly securely in place.

The usual rope guard 16 is shown mounted upon the stern nut 17.

An alternative form of this oil retaining packing which has been found to have considerable advantages in certain respects is illustrated in Fig. 4 in which 18 represents a ring containing member provided with grooves 19 in which are mounted the oil retaining rings 20, 21. Part 18 is bolted to the propeller boss 22 and projects into a casing 23 bolted to the end of the stern tube. This construction is of course a considerable simplification of that just described but has been found to answer satisfactorily for many draft. In this form a white metal liner 24 is provided at the inboard and outboard end of the stern tube, a heavy ring of white metal 25 being provided adjacent the extremities thereof and held in a groove formed in the stern tube. A ring containing member 23' may be employed, as illustrated in Fig. 4, at the inboard end of the stern tube. In this case the part 18 is bolted to the nut 26 on the inner end of the stern while the part 18 is keyed or otherwise secured to rotate with the tail shaft.

The problem to be solved is to supply lubricant to the recess 3 in such way that loss of lubricant outwardly through the packing rings or entry of water inwardly through said rings is prevented. This problem involves the supply of lubricant to the recess 3 under a pressure which will practically perfectly compensate or be equal to the pressure of the water acting upon the outboard end of the tail shaft mounting. The packing at the inboard end of the tail shaft is subjected to much less vibration than the outboard end and can be maintained sufficienty tight to prevent loss of lubricant under any pressure met in practice.

To satisfy these conditions, according to the invention, lubricant is supplied to the tail shaft mounting under a pressure controlled by the pressure of the water acting on the outboard end of the stern tube.

The means by which this result is achieved in the construction shown in Fig. 1 comprises a lubricant reservoir 27 from which oil is pumped by any suitable power driven pump 28 through the conduit 29 to the recess 3. Advantageously the pump may be driven directly from the shaft 1 as shown. A conduit 30 leads from the recess 3 to the compensating cylinder 31. This cylinder contains a floating piston 32 serving to divide the interior of the cylinder into two portions, the upper of which contains water under the same pressure as that acting on the outboard end of the stern tube, for this purpose the upper end of the cylinder is connected by the pipe 33 to an outlet at approximately the level of the said end of the stern tube. Pipe 30 opens into the lower portion of the cylinder and this portion of the cylinder is also connected to the lubricant reservoir by pipe 35. The function of piston 32 is to control the flow of lubricant back to the lubricant reservoir 27 according to the pressure of the water in the upper portion of the piston. This result may be effected in several ways, as illustrated in Fig. 3, pipes 29, 30, and 35 are of a size sufficient to carry the greatest flow of lubricant that has to be provided for. The pipe 35' opens into the lower portion of cylinder by means of elongated orifice 34 which may be substantially closed or completely opened by the movement of the piston, which is of sufficient depth to at all times seal this orifice against entry of water. This construction provides a very desirable simplicity and surety of operation since it comprises only one moving part positively operated in both directions by the pressures serving to control the functioning of the device. It will be readily understood that the nearer the outboard end of the stern tube is lifted to the water line the less will be the pressure acting downwardly on the piston 32 which will accordingly be forced upwardly through the pressure of the oil acting on its under side until the orifice leading to pipe 35 is open to an extent such that the oil flows through the pipe in such a way that the pressure in recess 3 falls until equal to that in the upper portion of the cylinder and therefore to that of the water acting on the outer end of the tail shaft mounting; while when the outboard end of the stern tube is lowered into the water so the pressure acting upon the upper side of the piston 32 is increased, the opening of the orifice leading to pipe 35 is decreased and the pressure in the recess 3 automatically increased until equal to the pressure of the water acting on the outer end of the tail shaft mounting. It is to be understood of course that the pump serving to circulate the lubricant is of a capacity sufficient to pump a volume of lubricant under a pressure which will build up rapidly a pressure in the tail shaft mounting equal to the maximum pressure of the water to be expected in practice.

Various refinements which may be found desirable may of course be incorporated as will be understood by those familiar with the art, such for instance as a by-pass valve to avoid excess pressure in the pipe line, or valves in the various pipes to enable the capacities thereof to be varied as for instance may be found desirable in adapting one size of apparatus to a range of tail shaft mountings of various constructions for vessels of differing different draft or to meet other variations met with in practice.

In some circumstances it might be found expedient to replace the conduit connecting the control cylinder to the outside water by some other device such as an electric switch operated by the variations of pressure to open or close the outlet port in the control cylinder. Further, it might be found advantageous to provide spiral grooves to lead lubricant to the various surfaces in frictional contact and in Fig. 1 such grooves are shown arranged in the after bushing and in the sides of the oil retaining rings at 36.

As before stated it will be obvious that various constructional modifications of the described apparatus may be readily made and it is, therefore, to be understood that the invention is not to be in any way restricted to the constructional forms described or illustrated, but only as defined by the scope of the appended claims.

What I claim is:—

1. A tail shaft mounting comprising in combination a tail shaft, a stern tube, a lubricant containing chamber arranged between said tail shaft and stern tube, means to supply lubricant under pressure to said lubricant containing chamber and means to control the pressure of the lubricant in said chamber, said pressure control means responding to variations in the pressure of the water acting upon the outboard end of said tail shaft mounting.

2. A tail shaft mounting comprising in combination a tail shaft, a stern tube, a lubricant containing chamber arranged between said tail shaft and stern tube, means to supply lubricant under pressure to said chamber, and means to control the pressure of the lubricant in said chamber, said control means being actuated by the water pressure acting upon the outboard end of said tail shaft mounting.

3. A tail shaft mounting comprising a stern tube, a lubricant containing chamber arranged between said tail shaft and stern tube, a power driven pump to supply lubricant under pressure to said chamber, a conduit connecting said power driven pump to a lubricant reservoir, a conduit connecting said power driven pump to said lubricant containing chamber, a conduit connecting said lubricant containing chamber to a cylinder divided into two portions by a floating piston, an outlet port for said portion of the cylinder and means whereby said piston is moved according to variations of pressure due to varying depth of the outboard end of the tail shaft mounting below the water level to vary the opening of said port.

4. A tail shaft mounting as claimed in claim 2 in which the floating piston is moved to vary the opening of the outlet port for the lubricant containing portion of the control cylinder by the pressure of water contained in another portion of said cylinder exerting on said piston substantially the same pressure as the water at the outboard end of the tail shaft mounting, the water containing portion of said cylinder being in communication by an open conduit with the outside of the vessel at substantially the same level as the outboard end of the tail shaft mounting.

In testimony whereof I have affixed my signature.

ALEXANDER McNAB.